United States Patent
Hwang (10) Patent No.: US 7,379,492 B2
(45) Date of Patent: May 27, 2008

(54) ADAPTIVE MODULATION CODING SYSTEM AND METHOD IN A MOBILE COMMUNICATION NETWORK

(75) Inventor: In Tae Hwang, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 656 days.

(21) Appl. No.: 10/463,659

(22) Filed: Jun. 17, 2003

(65) Prior Publication Data
US 2003/0231706 A1    Dec. 18, 2003

(30) Foreign Application Priority Data
Jun. 18, 2002    (KR) .................. 10-2002-0034025

(51) Int. Cl.
   *H04B 5/16*    (2006.01)
   *H04B 1/69*    (2006.01)
(52) U.S. Cl. ..................... 375/219; 375/130
(58) Field of Classification Search ............... 375/219, 375/130, 261, 269, 147, 148, 296; 370/337, 370/347; 455/101, 106
See application file for complete search history.

(56) References Cited

U.S. PATENT DOCUMENTS 6,330,288 B1 * 12/2001 Budka et al. ............... 375/296
6,366,601 B1    4/2002 Ghosh et al.
7,103,325 B1 * 9/2006 Jia et al. ..................... 455/101

FOREIGN PATENT DOCUMENTS

KR    2001-0079740    8/2001
KR    1020020014774    2/2002

* cited by examiner

*Primary Examiner*—Khai Tran
(74) *Attorney, Agent, or Firm*—Lee, Hong, Degerman, Kang & Schmadeka (57) ABSTRACT

An encoding method in a mobile communication system is provided. The method comprises selecting at least one adaptive coding rate and at least one modulation method according to estimated forward channel characteristics for a plurality of transmission antennas, based on BLAST-decoded signals received from a plurality of reception antennas; coding and modulating a plurality of transmission signal layers generated for transmission by the plurality of transmission antennas according to the selected adaptive coding rate and modulation method; and transmitting the plurality of transmission signal layers to the plurality of transmission antennas simultaneously by way of V-BLAST-coding.

34 Claims, 8 Drawing Sheets

| MCS | Code rate | Modulation |
|-----|-----------|------------|
| 1 | 1/3 | QPSK |
| 2 | 2/3 | QPSK |
| 3 | 2/3 | 8PSK |
| 4 | 2/3 | 16QAM |

BLAST SER PERFORMANCE (Tx ANTENNA 2, QPSK)

FIG. 7

BLAST SER PERFORMANCE (Tx ANTENNA 4, QPSK)

ADAPTIVE MODULATION CODING SYSTEM AND METHOD IN A MOBILE COMMUNICATION NETWORK

CROSS REFERENCE TO RELATED APPLICATION

Pursuant to 35 U.S.C. § 119(a), this application claims the benefit of earlier filing date and right of priority to Korean Patent Application No. 2002-34025, filed on Jun. 18, 2002, the content of which is hereby incorporated by reference herein in its entirety.

BACKGROUND OF THE INVENTION

1. Field of the Invention

The present invention relates to a mobile communication system and, in particular, to an adaptive modulation coding apparatus for providing multimedia communication services in a mobile communication network.

2. Related Art

In a mobile communication system, mass capacity of transmission data and acceleration of data transmission speed are required to deal with the need for various multimedia services. Accordingly, methods are needed for using a limited frequency efficiently. One of the methods is AMC (adaptive modulation and coding) scheme. The AMC scheme is for varying encoding and modulating methods according to variation of forward channel characteristics.

Figure 1:
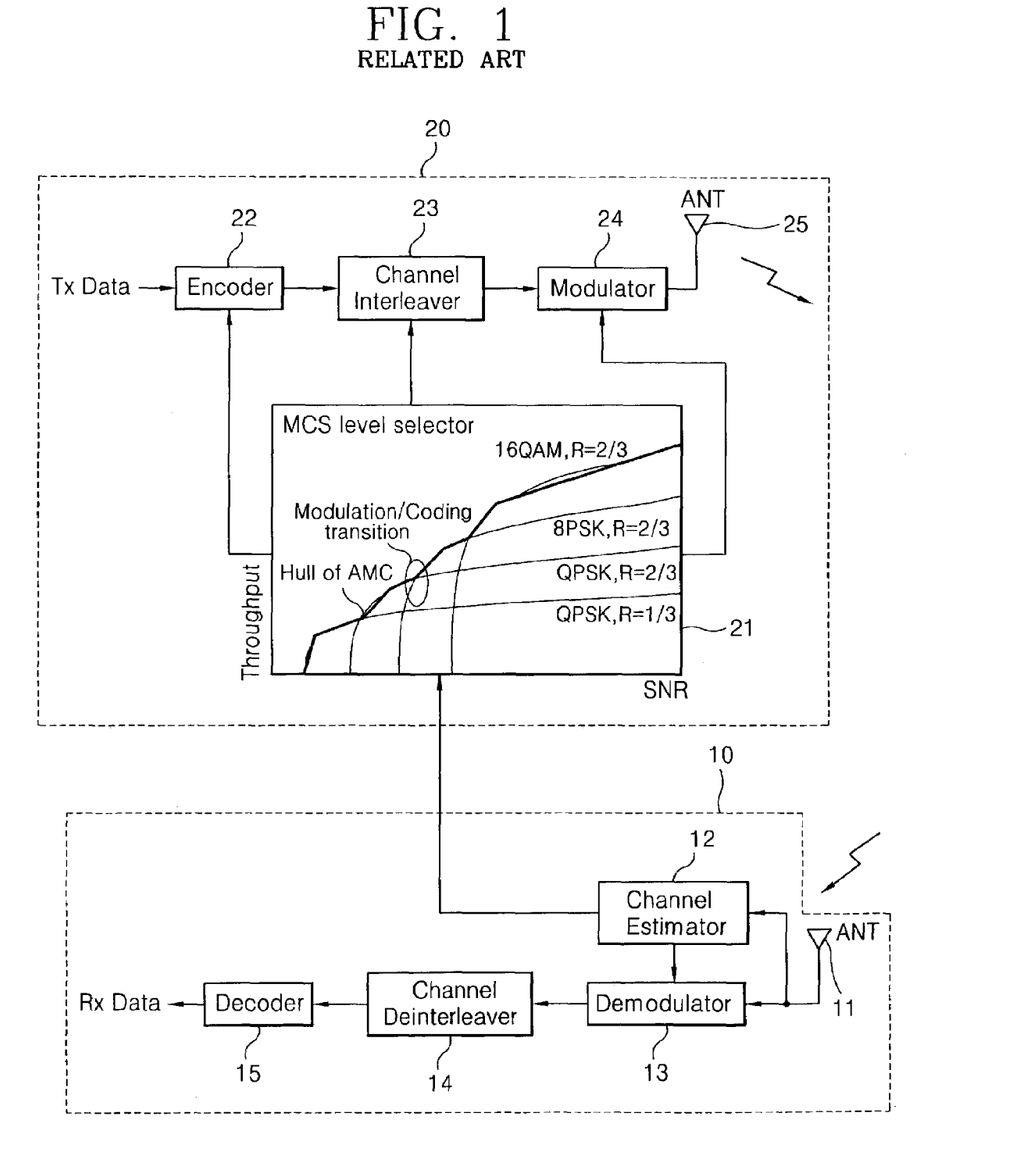
FIG. 1 is a block diagram of an AMC apparatus for a general mobile communication system.

FIG. 1 is a block diagram illustrating an AMC apparatus for a general mobile communication system. The AMC apparatus comprises an AMC receiver 10 for estimating forward channel characteristics by using a reception signal received through a reception antenna. AMC receiver 10 selects a level of a MCS (modulation coding scheme) according to the estimated forward channel characteristics and provides a feedback of the estimated forward channel characteristics. AMC receiver 10 also demodulates and decodes the reception signal. The AMC apparatus also includes an AMC transmitter 20 for selecting a level of a MCS according to the feedback forward channel characteristics, and coding and modulating transmission data according to the selected MCS level.

The AMC receiver 10 includes a channel estimator 12 for estimating forward channel characteristics by way of a reception signal received through the reception antenna 11. The AMC receiver 10 also includes a demodulator 13 for detecting a demodulation method according to the forward channel characteristics estimated in the channel estimator 12. The AMC receiver 10 demodulates the reception signal according to the demodulation method. A channel deinterleaver 14 for channel-deinterleaving the reception data demodulated in the demodulator 13; and a decoder 15 for decoding the reception data outputted from the channel deinterleaver 14, may also be included in the AMC receiver 10.

The AMC transmitter 20 includes a MCS level selector 21 for selecting a MCS level, according to the forward channel characteristics transmitted from the AMC receiver 10. The AMC transmitter 20 also includes an encoder 22 for encoding transmission data according to a pertinent coding rate of the feedback MCS level from the AMC receiver 10, a channel interleaver 23 for channel-interleaving transmission data encoded in the encoder 22 according to the MCS level, and a modulator 24 for modulating the transmission data outputted from the channel interleaver 23 according to a pertinent modulation method of the MCS level and transmitting it to a transmission antenna 25.

The AMC receiver 10 is included in a mobile communication terminal, and the AMC transmitter 20 is included in a base station. The base station can perform the MCS level selecting by feedback-receiving SNR (signal noise ratio) of a forward channel from the mobile terminal. The mobile terminal can perform the MCS level selecting according to the estimated SNR of the forward channel to provide feedback to the base station.

Figure 2:
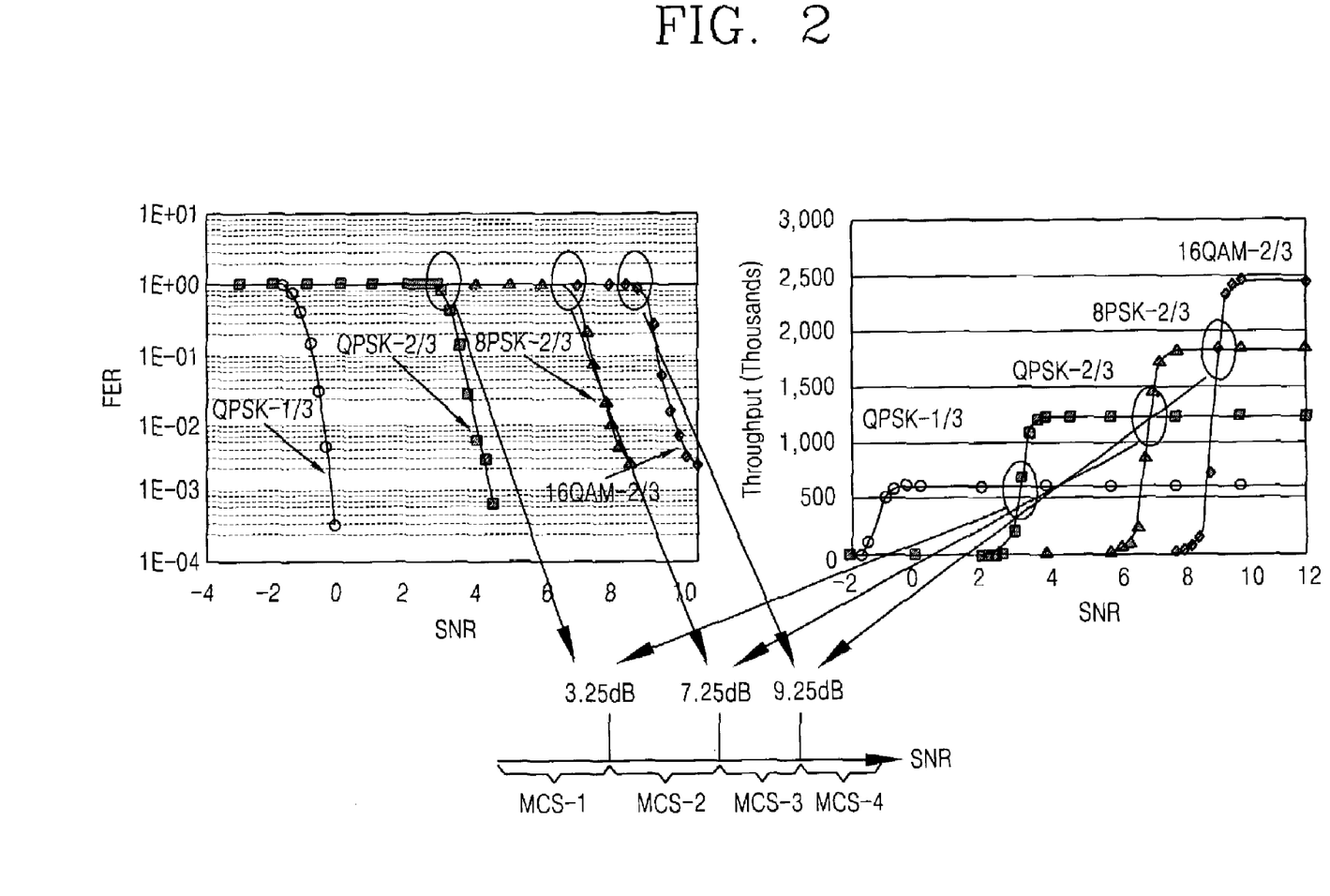
FIG. 2 illustrates a clarification method of MCS levels according to a SNR level of a channel, in accordance with one embodiment.

First, a method for classifying a MCS level according to channel characteristics will be described. FIG. 2 shows a method for classifying each MCS level according to a FER (frame error rate) about a SNR level and throughput. For example, when a channel SNR is not less than 3.25 dB and not greater than 7.25 dB, a 2/3 encoding ratio-QPSK (quadrature phase shift keying) modulation method has a throughput greater than that of an 1/3 encoding ratio-QPSK modulation method.

In addition, when a channel SNR is not less than 7.25 dB and not greater than 9.25 dB, a 2/3 encoding ratio-8PSK (phase shift keying) modulation method has a throughput greater than that of the 2/3 encoding ratio-QPSK modulation method. When a channel SNR is not less than 9.25 dB, a 2/3 encoding ratio-16QAM (quadrature amplitude modulation) method has a throughput greater than that of the 1/3 encoding ratio-QPSK modulation method.

Accordingly, when a channel SNR is not greater than 3.25 dB, the 1/3 encoding ratio-QPSK modulation method is selected. When a channel SNR is not less than 3.25 dB and not greater than 7.25 dB, the 2/3 encoding ratio-QPSK modulation method is selected. When a channel SNR is not less than 7.25 dB and not greater than 9.25 dB, the 2/3 encoding ratio-8PSK modulation method is selected. When a channel SNR is not less than 9.25 dB, the 2/3 encoding ratio-16QAM modulation method is selected.

Figure 3:
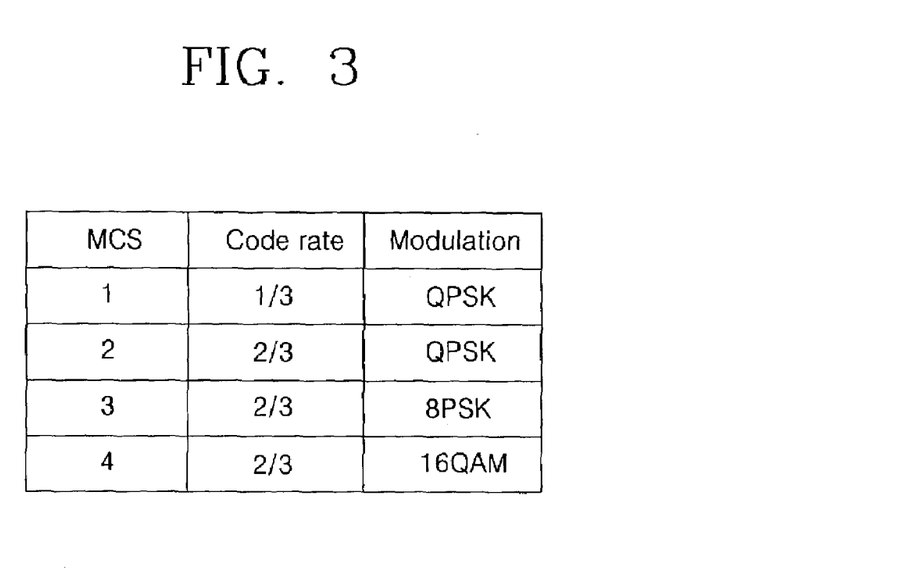
FIG. 3 is a table showing various MCS levels, in one or more embodiments.

FIG. 3 is a table showing MCS levels with reference to FIG. 2. As depicted in FIG. 3, a MCS level 1 shows the 1/3 encoding ratio-QPSK modulation method. A MCS level 2 shows the 2/3 encoding ratio-QPSK modulation method. A MCS level 3 shows the 2/3 encoding ratio-8PSK modulation method, and a MCS level 4 shows the 2/3 encoding ratio-16QAM modulation method.

Hereinafter, the operation of the adaptive modulation coding (AMC) apparatus of the general mobile communication system will be described. The channel estimator 12 of the AMC receiver 10 estimates the forward channel characteristics by using the reception signal from the reception antenna 11. The estimated forward channel characteristics are provided by the mobile terminal to the AMC transmitter 20 of the base station.

The demodulator 13 of the AMC receiver 10 detects a demodulation method according to the estimated forward channel characteristics and demodulates the reception signal according to the detected demodulation method. The demodulated reception signal is decoded through the channel deinterleaver 14 and the decoder 15.

When the AMC transmitter 20 receives the MCS level transmitted from the AMC receiver 10, the MCS level selector 21 of the AMC transmitter 20 selects an optimum MCS level according to the forward channel characteristics. Encoding, channel interleaving and modulation of the forward channel are thus performed according to the selected MCS level.

The encoder 22 of the AMC transmitter 20 encodes transmission data according to a pertinent encoding ratio of the MCS level. The channel interleaver 23 performs channel-interleaving of the encoded transmission data according to the MCS level. The modulator 24 modulates the transmission data according to a pertinent modulation method of the MCS level and transmits the modulated transmission signal (i.e., transmission symbol) via the transmission antenna 25.

As described above, in the adaptive modulation coding (AMC) apparatus of a general multimedia communication system, transmission performance can be improved by varying modulation and coding schemes according to channel characteristics. However, it is difficult to correspond to acceleration of data transmission speed required for providing various and rapid multimedia services with the transmission performance improvement by the AMC scheme.

SUMMARY OF THE INVENTION

In accordance with one or more embodiments of the invention, a signal coding apparatus for a mobile communication system in provided. The apparatus comprises an AMC receiver for BLAST-decoding signals received from a plurality of reception antennas, and estimating forward channel characteristics for a plurality of transmission antennas; and an AMC transmitter for selecting at least one adaptive coding rate and at least one modulation method according to the estimated forward channel characteristics, coding and modulating a plurality of transmission signal layers generated for transmission by the plurality of transmission antennas according to the selected adaptive coding rate and modulation method, and transmitting the plurality of transmission signal layers to the plurality of transmission antennas simultaneously by way of BLAST-coding.

The plurality of transmission signal layers are generated based on the number of the plurality of transmission antennas. The AMC receiver is operational to receive communication signals in a mobile terminal. The AMC transmitter is operational to transmit communication signals in a base station. The AMC receiver comprises a BLAST decoder for BLAST-decoding signals received from the plurality of reception antennas to produce at least one symbol; and a channel estimator for estimating forward channel characteristics of the transmission antennas based on the symbol.

The apparatus also comprises a demodulator for detecting a demodulation method based on the forward channel characteristics; and demodulating the symbol based on the demodulation method. In some embodiments, a channel deinterleaver for channel-deinterleaving of the symbol demodulated by the demodulator may be also included. A decoder for may be also included for decoding output from the channel deinterleaver.

The AMC receiver further comprises a demodulator for detecting a demodulation method based on the forward channel characteristics; and demodulating the symbol based on the demodulation method; a channel deinterleaver for channel-deinterleaving of the symbol demodulated by the demodulator; and a decoder for decoding output from the channel deinterleaver.

The AMC transmitter comprises a MCS level selector for selecting an optimum coding rate and modulation method according to the estimated forward channel characteristics; and an encoder for encoding the plurality of transmission signal layers, according to the selected adaptive coding rate and the modulation method. The AMC transmitter further comprises a channel interleaver for channel-interleaving the encoded plurality of transmission signal layers according to the coding rate.

The AMC transmitter further comprises a modulator for modulating the plurality of transmission signal layers produced the channel interleaver according to the modulation method. In certain embodiments, the AMC transmitter further comprises a BLAST processing unit for transmitting at least one symbol in the plurality of transmission signal layers to the plurality of transmission antennas simultaneously by way of BLAST-coding, wherein the transmission symbol has a vertical form in temporal and spatial axes.

In one embodiment, a mobile terminal is in communication with a base station in a mobile communications network. The mobile terminal comprises an adaptive modulation (AMC) system wherein the AMC system comprises an AMC receiver for BLAST-decoding signals received from a plurality of reception antennas, and estimating forward channel characteristics for a plurality of transmission antennas.

The AMC receiver comprises a BLAST decoder for BLAST-decoding signals received from the plurality of reception antennas to produce at least one symbol; a channel estimator for estimating forward channel characteristics of the transmission antennas based on the symbol; a demodulator for detecting a demodulation method based on the forward channel characteristics; and demodulating the symbol based on the demodulation method; a channel deinterleaver for channel-deinterleaving of the symbol demodulated by the demodulator; and a decoder for decoding output from the channel deinterleaver.

A base station in a mobile communications network is in communication with a mobile terminal, the base station comprises an adaptive modulation (AMC) system wherein the AMC system comprises an AMC transmitter for selecting at least one adaptive coding rate and at least one modulation method according to forward channel characteristics provided by a mobile terminal, coding and modulating a plurality of transmission signal layers generated for transmission by a plurality of transmission antennas according to the selected adaptive coding rate and modulation method, and transmitting the plurality of transmission signal layers to the plurality of transmission antennas simultaneously by way of BLAST-coding.

In one embodiment, the AMC transmitter comprises a MCS level selector for selecting an optimum coding rate and modulation method according to the estimated forward channel characteristics; and an encoder for encoding transmission signal layers, according to the selected adaptive coding rate and the modulation method. The AMC transmitter further comprises a channel interleaver for channel-interleaving the encoded transmission signal layers according to the coding rate.

The AMC transmitter may further comprise a modulator for modulating the transmission signal layers produced the channel interleaver according to the modulation method. The AMC transmitter further comprises a BLAST processing unit for transmitting at least one symbol in the transmission signal layers to the plurality of transmission antennas simultaneously by way of BLAST-coding, wherein the transmission symbol has a vertical form in temporal and spatial axes.

In accordance with yet another embodiment, an adaptive modulation coding (AMC) method for a mobile communication system is provided. The method comprises selecting at least one adaptive coding rate and at least one modulation method according to estimated forward channel characteristics for a plurality of transmission antennas in a base station of the mobile communication system, based on BLAST-decoded signals received from a plurality of reception antennas of a mobile terminal in communication with said base station; coding and modulating a plurality of transmission signal layers generated for transmission by the plurality of transmission antennas according to the selected adaptive coding rate and modulation method; and transmitting the plurality of transmission signal layers to the plurality of transmission antennas simultaneously by way of V-BLAST-coding.

In certain embodiments a 1/3 coding rate and a QPSK method are selected when SNR of a forward channel is not greater than a first threshold value. In some embodiments, a 2/3 coding rate and a QPSK method are selected when SNR of a forward channel is not less than the first threshold value and not greater than a second threshold value. In one embodiment, a 2/3 coding rate and a 8PSK method are selected when SNR of a forward channel is not less than the second threshold value and not greater than a third threshold value.

In one or more embodiments a 2/3 coding rate and a 16QAM method are selected when SNR of a forward channel is not less than the third threshold value. In some embodiments, a 1/3 coding rate and a QPSK method are selected when SNR of a forward channel is not greater than a first threshold value; and a 2/3 coding rate and a QPSK method are selected when SNR of a forward channel is not less than the first threshold value and not greater than a second threshold value; and a 2/3 coding rate and a 8PSK method is selected when SNR of a forward channel is not less than the second threshold value and not greater than a third threshold value; and a 2/3 coding rate and a 16QAM method are selected when SNR of a forward channel is not less than the third threshold value.

In some embodiments, a coding rate and modulation method to at least one of the plurality of transmission antennas is applied. The BLAST-decoding step may comprise arranging the signals received from the plurality of reception antennas as a reception vector; estimating a certain symbol by regarding other symbols in the signals as an interference signal while estimating the certain symbol; and subtracting a first-detected signal components from the reception vector.

The V-BLAST coding comprises transmitting transmission data of each plurality of transmission signal layers to each of the plurality of transmission antennas simultaneously such that the transmission data of each of the plurality of transmission signal layers has a vertical form in temporal and spatial axes. An encoding method in a mobile communication system comprises selecting at least one adaptive coding rate and at least one modulation method according to estimated forward channel characteristics for a plurality of transmission antennas, based on BLAST-decoded signals received from a plurality of reception antennas; coding and modulating a plurality of transmission signal layers generated for transmission by the plurality of transmission antennas according to the selected adaptive coding rate and modulation method; and transmitting the plurality of transmission signal layers to the plurality of transmission antennas simultaneously by way of V-BLAST-coding.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENT

One or more embodiments of the invention comprise a Bell-lab Layered Space-Time (BLAST). In a BLAST, there are plurality of transmission antennas and reception antennas. Each transmission antenna transmits data different from the other transmission antennas, and the reception antenna detects data different from the other reception antennas. In comparison with a system using one antenna, it is possible to improve transmission performance by increasing the amount of data transmitted at the same time by increasing the number of antennas.

A BLAST is divided into a Diagonal-BLAST (D-BLAST) and a Vertical-BLAST (V-BLAST). Both BLASTs perform parallel-processing of sequentially-inputted transmission data according to the number of available transmission antennas. Each BLAST modulates and encodes the data. Because transmission data is continually inputted, bit strings, namely, layers are formed. A difference between the D-BLAST and the V-BLAST is whether the transmission antenna for transmitting each layer is periodically changed after the layers are formed.

Figure 4:
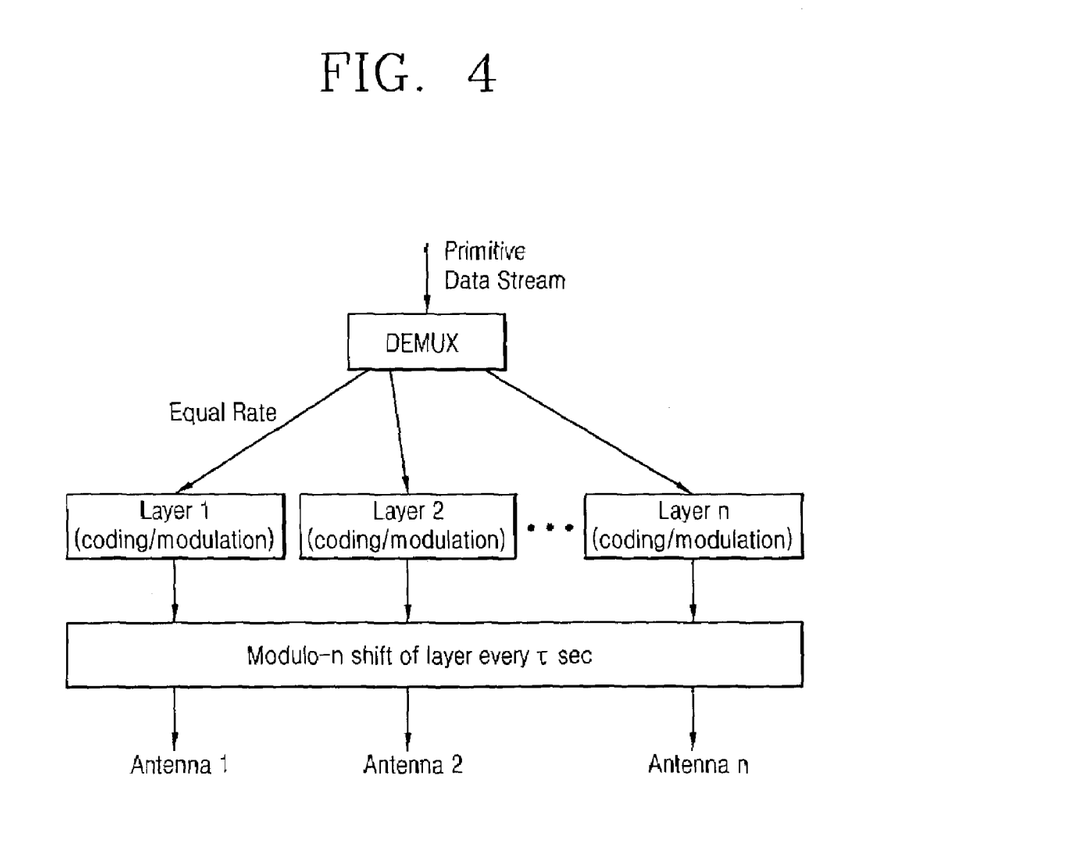
FIG. 4 illustrates a flow diagram for an exemplary D-BLAST transmission system, in accordance with one embodiment.
Figure 5:
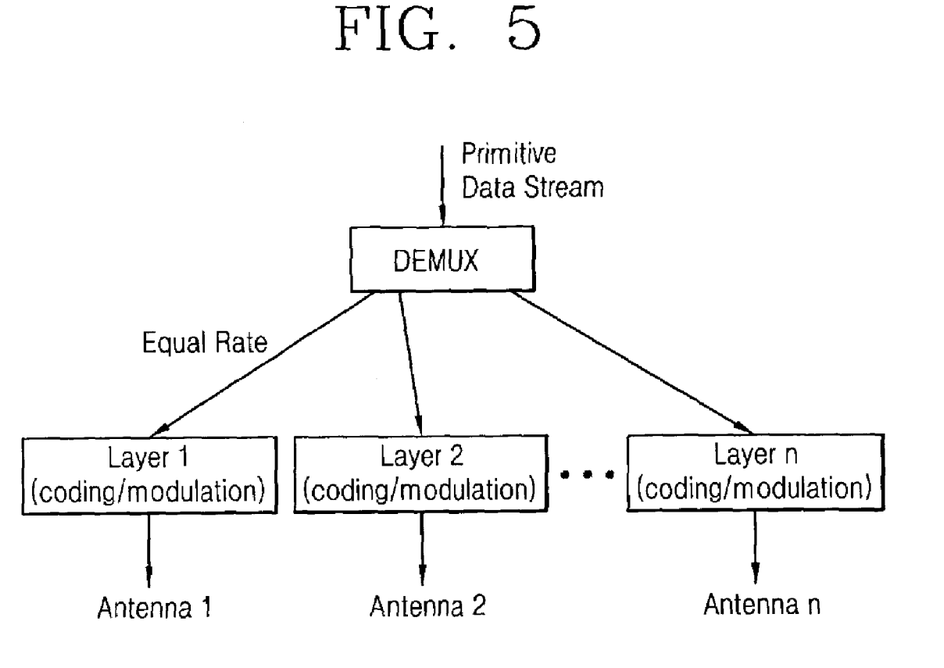
FIG. 5 illustrates a flow diagram for a D-BLAST transmission system, in accordance with one embodiment of the invention.
Figure 6:
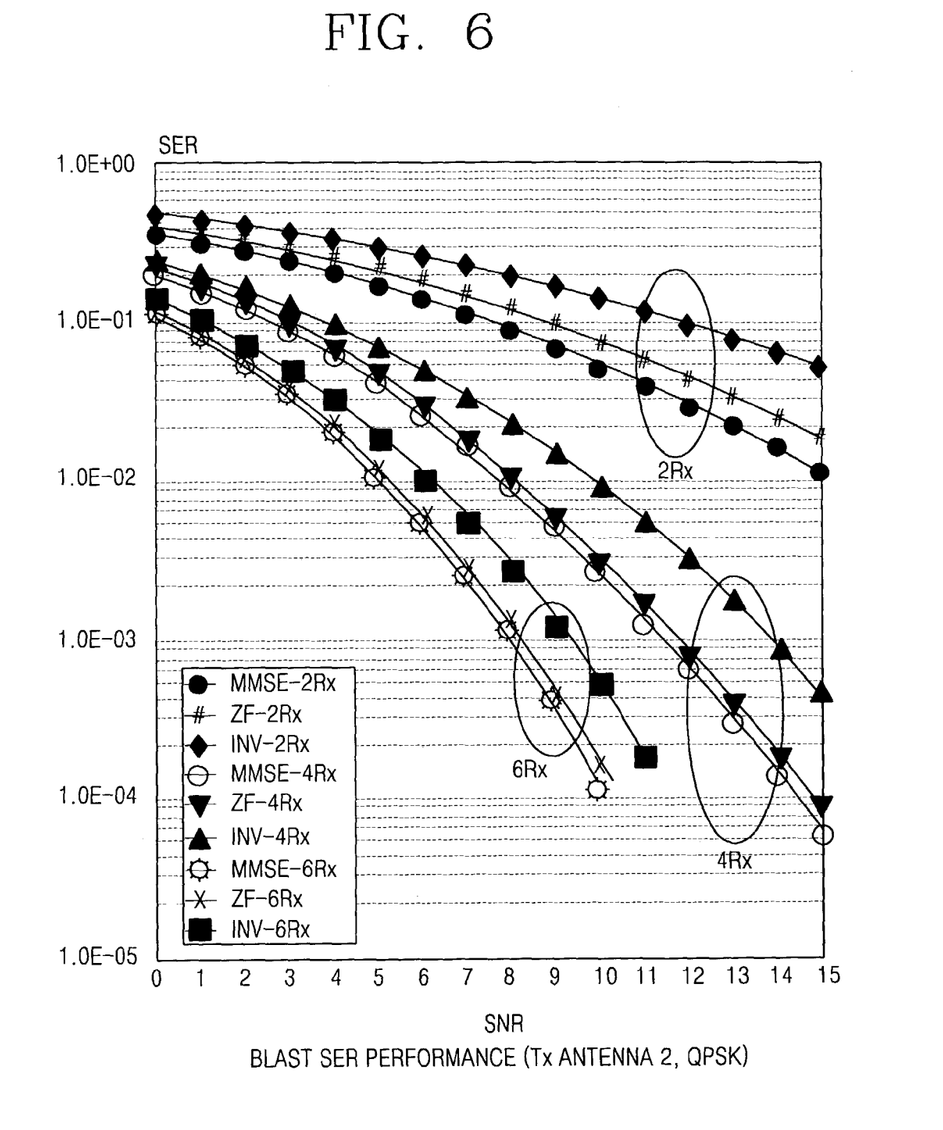
FIG. 6 shows an error performance chart according to an exemplary BLAST in a QPSK, with two transmission antennas, in accordance with one embodiment.

Referring to FIG. 4 a D-BLAST transmission system periodically transmits data outputted from a certain layer through a particular transmission antenna. Accordingly, data of each layer is diagonally transmitted on spatial and temporal axes. Referring to FIG. 5, a V-BLAST transmission system transmits data of each layer through a specific transmission antenna. Accordingly, data of each layer has a vertical form on spatial and temporal axes. The reception system using a BLAST can detect transmission data transmitted from each transmission antenna by using methods such as a ZF (zero forcing), a MMSE (minimum mean square error) and an INV, for example.

When the reception system compensates influences of a channel in a reception signal detection, in the INV method which performs only nulling by multiplying pseudo-inverse matrix of channel reply matrix by the reception signal and the methods performing both nulling and canceling (MMSE, ZF), an error performance is varied according to the number of reception antennas. The more the number of reception antennas, the better an error performance shows.

Figure 7:
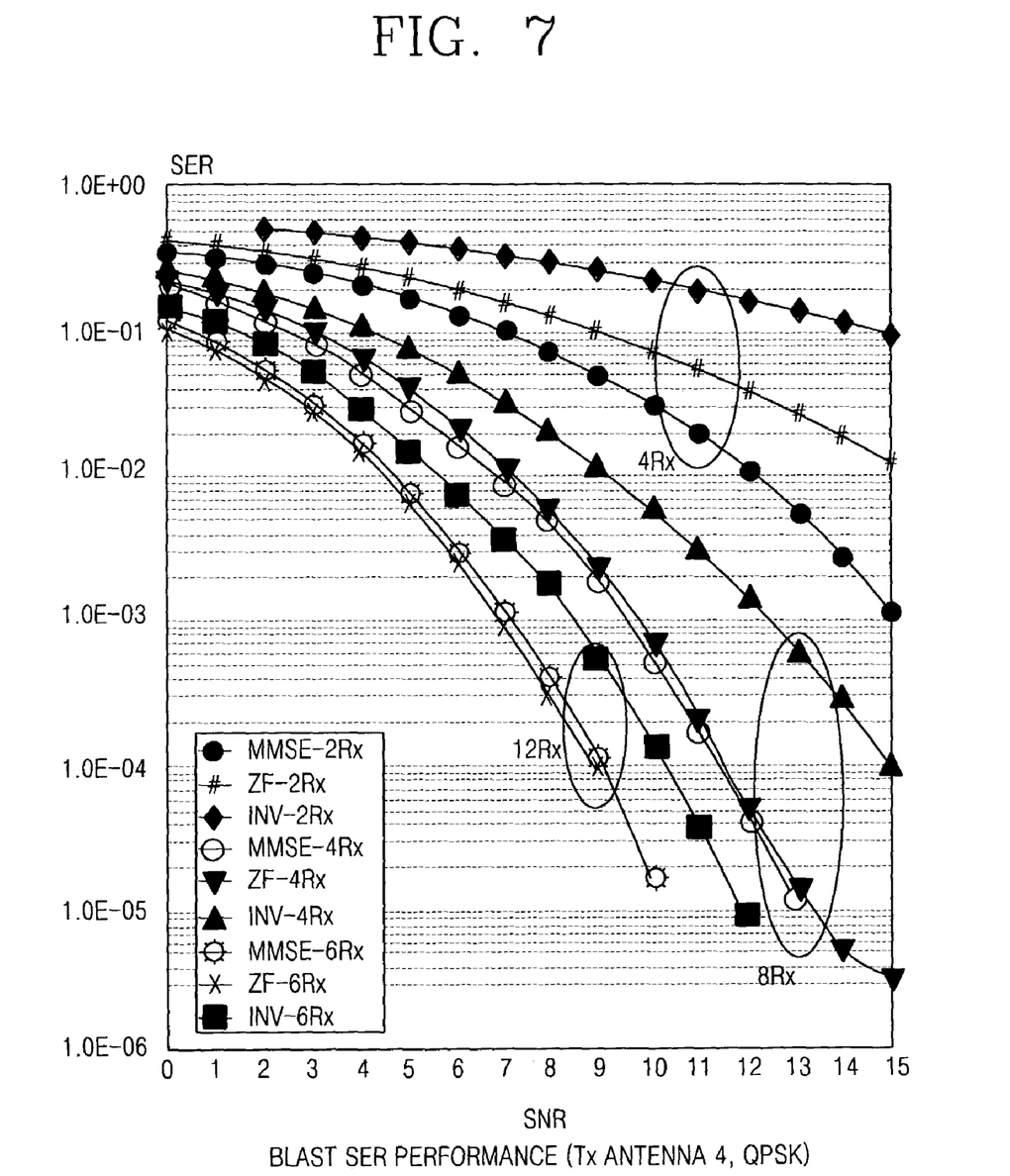
FIG. 7 shows an error performance chart according to an exemplary BLAST in the QPSK, with four transmission antennas, in accordance with one embodiment.

FIG. 7, for example, shows an error performance according to a BLAST in the QPSK with four transmission antennas. As shown, the more the number of reception antennas, the better the error performance. By transmitting different data independently through a plurality of antennas, transmission rate can be improved. In one embodiment, to improve data transmission capacity, a method for combining the AMC with the BLAST and using an adaptive modulation coding scheme about each forward channel according to the BLAST combination is presented.

Figure 8:
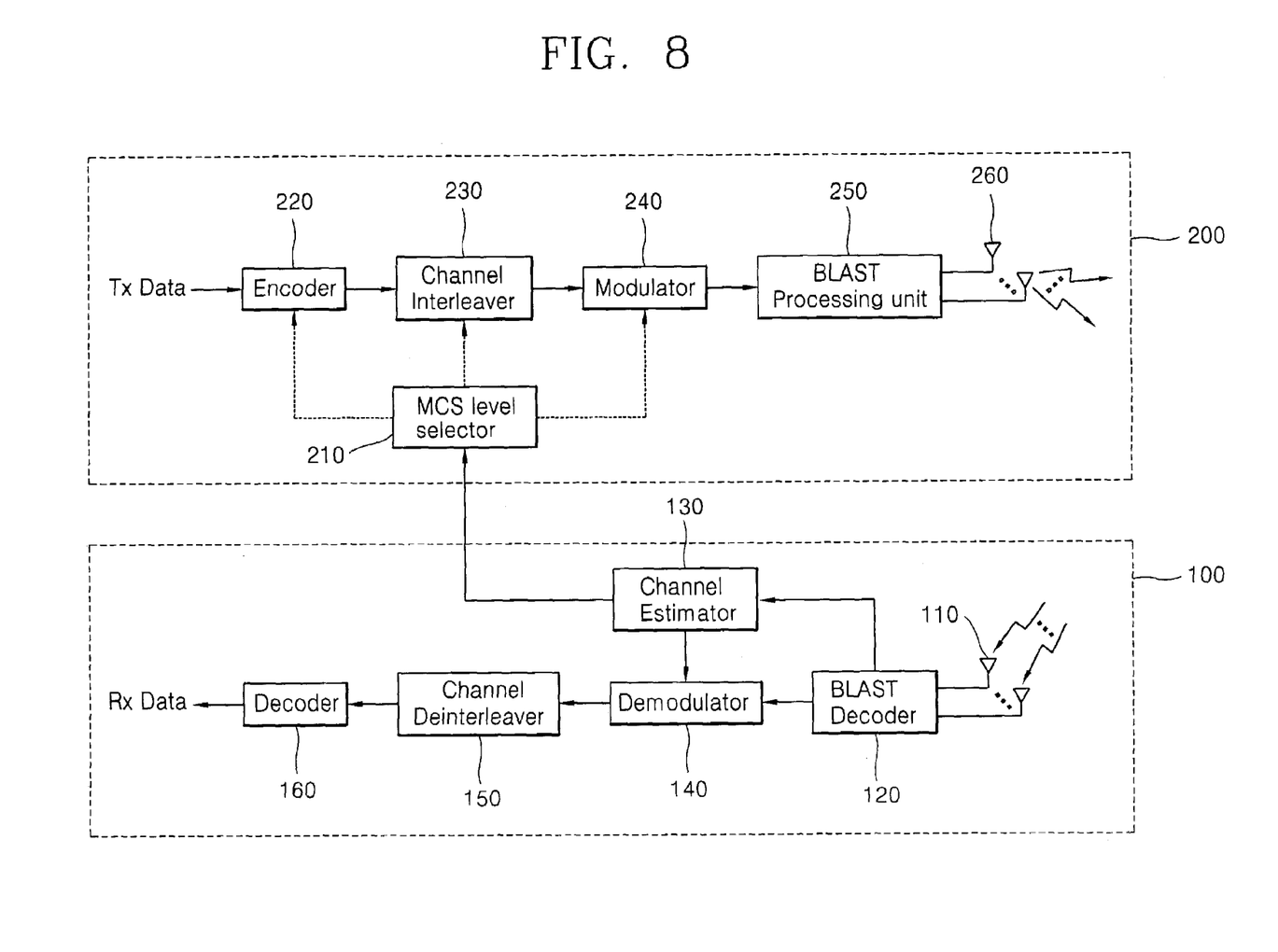
FIG. 8 is a block diagram illustrating a construction of an AMC apparatus for a mobile communication system, in accordance with one embodiment of the invention.

Referring to FIG. 8, the AMC apparatus for the mobile communication system, in accordance with one embodiment of the invention, comprises an AMC receiver 100 for estimating forward channel characteristics by detecting reception signals received from one or more reception antennas 110 via one or more transmission antennas. The AMC receiver 100 provides feedback of the estimated forward channel characteristics. The AMC apparatus also comprises a AMC transmitter 200 for selecting a MCS level by transmission antennas according to the feedback forward channel characteristics.

The AMC receiver 100 forms as many transmission data layers as the number of transmission antennas. The AMC receiver 100 also codes and modulates transmission data according to the MCS level. The AMC receiver 100 can be included in a mobile terminal, for example, and the AMC transmitter 200 can be included in a base station, for example, in accordance with one or more embodiments.

The AMC receiver 100 comprises a BLAST decoder 120 for BLAST-decoding reception signals received through plural reception antennas, a channel estimator 130 for estimating forward channel characteristics based on the output of the BLAST decoder 120, a demodulator 140 for detecting a demodulation method according to the forward channel characteristics estimated in the channel estimator 130, and demodulating the signals from the BLAST decoder 120 according to the demodulation method. A channel deinterleaver 150 for channel-deinterleaving data demodulated in the demodulator 140, and a decoder 160 for decoding the data outputted from the channel deinterleaver 150 may be also included in the AMC receiver 100.

The AMC transmitter 200 comprises a MCS level selector 210 for selecting MCS levels of the transmission antennas according to the forward channel characteristics feedback from the AMC receiver 100, an encoder 220 for encoding the transmission data by the transmission antennas according to a pertinent coding rate of the selected MCS level, a channel interleaver 230 for channel-interleaving the transmission data encoded in the encoder 220 according to the MCS level by the transmission antennas, a modulator 240 for modulating the transmission data outputted from the channel interleaver 230 according to a pertinent modulation method of the MCS level by the transmission antennas, and a BLAST processing unit 250 for transmitting transmission symbols of each layer modulated in the modulator 240 to a pertinent transmission antenna 260 in parallel in order to make them have a vertical form in temporal and spatial axes.

The MCS level selector 210 can be included in the AMC transmitter 200 of the base station or the AMC receiver 100 of the mobile terminal. When the MCS level selector 210 is included in the AMC receiver 100 of the mobile terminal, the AMC receiver 100 of the mobile terminal selects an optimum MCS level for a transmission antenna according to the estimated forward channel quality and performs feedback of the selected MCS level to the base station.

In one embodiment, the MCS level selector 210 is included in the AMC transmitter 200 of the base station. Plurality of transmission antennas 260 and reception antennas 110 are used in certain embodiments. The adaptation modulation coding method can be individually applied to each forward channel, or applied to one or more forward channels, for example, in common. An AMC mode is for applying the adaptive modulation coding method to plural forward channels, and it can be divided into a common MCS mode and an individual MCS mode. The AMC mode can be changed in run-time.

In one embodiment, a common MCS mode applies a MCS level to all transmission antennas 260 of the AMC transmitter 200 by applying the adaptive modulation coding method to forward channels, for example. In some embodiments, in the individual MCS mode each MCS level is applied to each transmission antenna 250 of the AMC transmitter 200, by applying each MCS level to each forward channel, for example. In the common MCS mode, the mobile terminal performs feedback of a MCS level about the lowest quality forward channel characteristics among forward channel characteristics to the base station. Then, the base station selects a MCS level of the lowest quality forward channel characteristics and applies the selected MCS level to one or more forward channels, for example.

In the individual MCS mode, the mobile terminal estimates a channel quality about each forward channel. The base station selects each MCS level according to the estimated channel quality of forward channel and applies each MCS level to each forward channel, for example. The AMC mode is coincidentally operated between the mobile terminal and the base station, in accordance with one embodiment.

The BLAST decoder 120 of the AMC receiver 100 constructs a reception signal received through the plural reception antennas 110 as a reception vector, regards other symbols as an interference signal while detecting a specific symbol, estimates a specific symbol and subtracts a previously detected signal component from the reception vector, and accordingly it estimates each symbol by the transmission antennas while minimizing influence of each symbol.

The channel estimator 130 of the AMC receiver 100 estimates forward channel characteristics by using symbols outputted from the BLAST decoder 120. The AMC receiver 100 performs feedback of the estimated forward channel characteristics to the AMC transmitter 200 of the base station. The demodulator 140 of the AMC receiver 100 detects a demodulation method of each forward channel according to the forward channel characteristics estimated in the channel estimator 130.

In some embodiments, the demodulation 140 demodulates symbols from the BLAST decoder 120 according to the demodulation method. The demodulated symbols provided by transmission antennas are decoded by passing the channel deinterleaver 150 and the decoder 160 sequentially in some embodiments.

The AMC transmitter 200 of the base station selects an optimum MCS level according to the forward channel characteristics feedback from the mobile terminal. For example, in the common MCS mode, the AMC transmitter 200 selects an optimum MCS level on the basis of the lowest forward channel characteristics and applies the selected MCS level to one or more forward channels. In the individual MCS mode, the AMC transmitter 200 selects an optimum MCS level about each forward channel characteristics and applies each MCS level to a respective forward channel.

With reference to accompanying FIGS. 2, 3, and 8, when a SNR of a forward channel is within the range of 3.25 dB~7.25 dB, the MCS level selector 210 selects a MCS level 2. When a SNR of a forward channel is within the range of 7.25 dB~9.25 dB, the MCS level selector 210 selects a MCS level 3. The encoder 220 of the AMC transmitter 200 performs demultiplexing of the transmission data as the number of the transmission antennas and encodes transmission data of layers generated as the number of the transmission antennas.

For example, with reference to FIG. 3, when the MCS level 2 is selected, the encoder 220 of the AMC transmitter 200 encodes transmission data of each layer (transmission data by the transmission antennas) according to an encoding rate of the MCS level 2. The channel interleaver 230 performs channel-interleaving of the encoded transmission data by the transmission antennas according to the MCS level 2. The modulator 240 modulates the channel-interleaved transmission data by the transmission antennas according to the modulation method (OPSK) of the MCS level 2.

The BLAST processing unit 250 transmits transmission symbols by transmission antennas to each transmission antenna 260, in parallel for example, in order to make the modulated transmission symbols by transmission antennas have a vertical form in temporal and spatial axes. For example, when there are 4 transmission antennas, by transmitting 4 transmission symbols simultaneously, transmission rate can be 4-times faster in comparison with a case having one transmission antenna.

The base station may comprise a plurality of transmission antennas. A plurality of data layers (e.g., 3) may be formed by demultiplexing transmission data according to the number of transmission antennas. The base station selects a MCS level of a forward channel according to forward channel characteristics estimated by the mobile terminal. The base station codes and modulates the transmission data layers according to the selected MCS level of forward channel, and transmits transmission data layers simultaneously through the plurality of transmission antennas. Accordingly a transmission rate can be improved.

Figure 9:
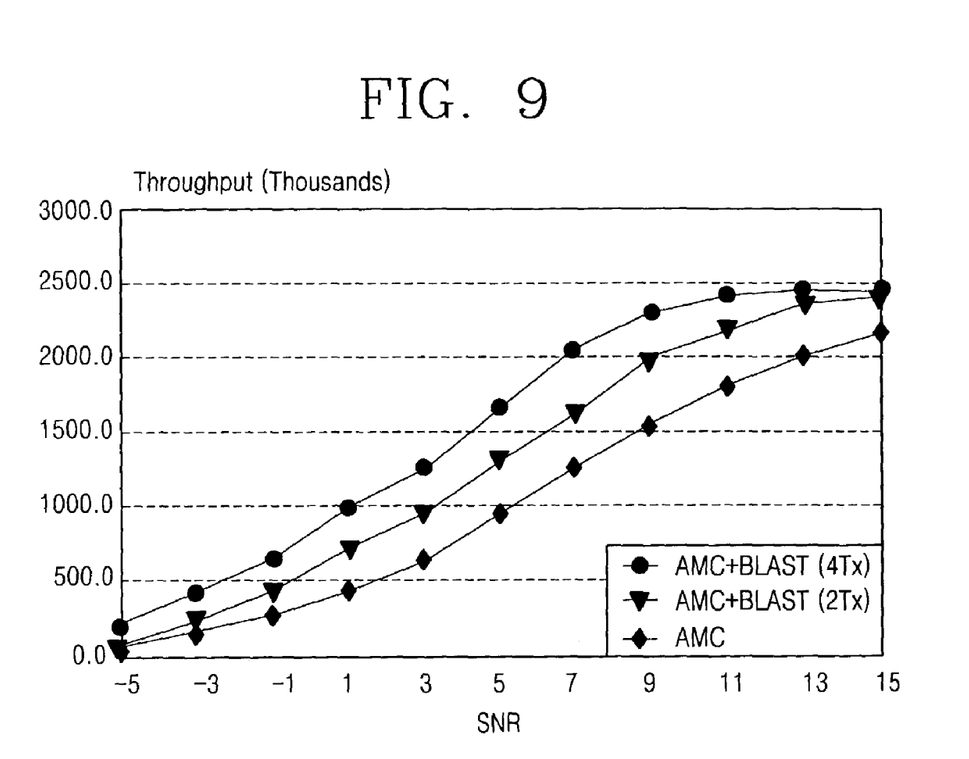
FIG. 9 shows a performance chart for the AMC apparatus for the mobile communication system, in accordance with one embodiment of the invention.

Referring to FIG. 9, in comparison with the conventional AMC apparatus including a transmission antenna and a reception antenna and using an adaptive modulation coding method about at least one forward channel, the AMC apparatus in accordance with the present invention shows a far better throughput about the same SNR. In addition, in the AMC apparatus of the present invention, a far better throughput is obtained in four transmission antennas (4 Tx) in comparison with two transmission antennas (2 Tx). The more the number of transmission antennas, the better the transmission performance of the AMC apparatus.

As such, by including a plurality of transmission antennas and reception antennas in a mobile communication system, estimating forward channel characteristic by BLAST-decoding signals received by the mobile terminal through reception antennas, and selecting an optimum MCS level of a forward channel according to the estimated forward channel characteristics, data transmission rate can be improved.

Embodiments of the invention are described by way of example as applicable to systems and corresponding methods that provide xxxxxxxxx system. In this exemplary embodiment, logic code for performing these methods is implemented in the form of, for example, application software. The logic code, in one embodiment, may be comprised of one or more modules that execute on one or more processors in a distributed or non-distributed communication model.

It should also be understood that the modules, processes, methods, and the like, described herein are but an exemplary implementation and are not related, or limited, to any particular system, apparatus, or operating system. Rather, various types of general-purpose computing machines or specially programmed devices may be used with logic code implemented in accordance with the teachings provided, herein. Further, the order in which the steps of the disclosed methods is performed is purely illustrative in nature. In fact, the steps can be performed in any order or in parallel, unless indicated otherwise by the present disclosure.

The method of the present invention may be performed in either hardware, software, or any combination thereof, as those terms are currently known in the art. In particular, the present method may be carried out by software, firmware, or macrocode operating on a computer or computers of any type. Additionally, software embodying the present invention may comprise computer instructions in any form (e.g., ROM, RAM, magnetic media, punched tape or card, compact disk (CD) in any form, DVD, etc.). Furthermore, such software may also be in the form of a computer signal embodied in a carrier wave, or remotely accessible. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. For example, while the present invention is described herein in connection with a mobile terminal and a base station in a mobile communication system, the present invention may also be used in connection with a wide variety of remotely operable networks or other mobile communication or wireless networks.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A signal coding apparatus for a mobile communication system, the apparatus comprising:
   an adaptive modulation and coding (AMC) receiver of a mobile communication terminal for BLAST-decoding signals received from a plurality of reception antennas of the mobile communication terminal to produce a first output, and using the first output to produce a second output generated by the mobile communication terminal, the second output comprising estimate forward channel characteristics for a plurality of transmission antennas in an AMC transmitter of a base station in communication with the mobile communication terminal;

wherein the AMC transmitter of the base station is configured for:

selecting at least one adaptive coding rate and at least one modulation method according to the estimated forward channel characteristics in the second output provided by the mobile communication terminal, coding and modulating a plurality of transmission signal layers generated for transmission by the plurality of transmission antennas according to the selected adaptive coding rate and modulation method, and transmitting the plurality of transmission signal layers to the plurality of transmission antennas simultaneously by way of BLAST-coding.

2. The apparatus of claim 1, wherein the plurality of transmission signal layers are generated based on the number of the plurality of transmission antennas.

3. The apparatus of claim 1, wherein the AMC receiver is operational to receive communication signals in a mobile terminal.

4. The apparatus of claim 1, wherein the AMC transmitter is operational to transmit communication signals in a base station.

5. The apparatus of claim 1, wherein the AMC receiver comprises:

a BLAST decoder for BLAST-decoding signals received from the plurality of reception antennas to produce at least one symbol; and a channel estimator for estimating forward channel characteristics of the transmission antennas based on the symbol.

6. The apparatus of claim 5, further comprising:
a demodulator for
detecting a demodulation method based on the forward channel characteristics; and
demodulating the symbol based on the demodulation method.

7. The apparatus of claim 6, further comprising:
a channel deinterleaver for channel-deinterleaving of the symbol demodulated by the demodulator.

8. The apparatus of claim 7, further comprising:
a decoder for decoding output from the channel deinterleaver.

9. The apparatus of claim 5, wherein the AMC receiver further comprises:
a demodulator for detecting a demodulation method based on the forward channel characteristics; and demodulating the symbol based on the demodulation method;
a channel deinterleaver for channel-deinterleaving of the symbol demodulated by the demodulator; and
a decoder for decoding output from the channel deinterleaver.

10. The apparatus of claim 1, wherein the AMC transmitter comprises:
a MCS level selector for selecting an optimum coding rate and modulation method according to the estimated forward channel characteristics; and
an encoder for encoding the plurality of transmission signal layers, according to the selected adaptive coding rate and the modulation method.

11. The apparatus of claim 10, wherein the AMC transmitter further comprises:
a channel interleaver for channel-interleaving the encoded plurality of transmission signal layers according to the coding rate.

12. The apparatus of claim 11, wherein the AMC transmitter further comprises:
a modulator for modulating the plurality of transmission signal layers produced the channel interleaver according to the modulation method.

13. The apparatus of claim 12, wherein the AMC transmitter further comprises:
a BLAST processing unit for transmitting at least one symbol in the plurality of transmission signal layers to the plurality of transmission antennas simultaneously by way of BLAST-coding, wherein the transmission symbol has a vertical form in temporal and spatial axes.

14. A mobile terminal in communication with a base station in a mobile communications network, the mobile terminal comprising an adaptive modulation and coding (AMC) system wherein the AMC system comprises an AMC receiver for BLAST-decoding signals received from a plurality of reception antennas of the mobile terminal to produce a first output, and using the first output to produce a second output generated by the mobile communication terminal, the second output comprising estimate forward channel characteristics for a plurality of transmission antennas of the base station in communication with the mobile communication terminal;

wherein the AMC transmitter of the base station is configured for selecting at least one adaptive coding rate and at least one modulation method according to the estimated forward channel characteristics in the second output provided by the mobile communication terminal.

15. The mobile terminal of claim 14, wherein the AMC receiver comprises:
a BLAST decoder for BLAST-decoding signals received from the plurality of reception antennas to produce at least one symbol;
a channel estimator for estimating forward channel characteristics of the transmission antennas based on the symbol;
a demodulator for detecting a demodulation method based on the forward channel characteristics; and demodulating the symbol based on the demodulation method;
a channel deinterleaver for channel-deinterleaving of the symbol demodulated by the demodulator; and
a decoder for decoding output from the channel deinterleaver.

16. A base station in a mobile communications network in communication with a mobile terminal, the base station comprising an adaptive modulation and coding (AMC) system wherein the AMC system comprises an AMC transmitter comprising:
at least one antenna for receiving forward channel characteristics information estimated by a mobile communication terminal in communication with the base station;
a first logic unit for selecting at least one adaptive coding rate and at least one modulation method according to forward channel characteristics information estimated by the mobile terminal in communication with the base station,
wherein the first logic unit produces a first output comprising data indicative of the adaptive coding rate;

wherein the first logic unit uses the first output to produces a second output generated by the mobile communication terminal, the second output comprising estimate forward channel characteristics for a plurality of transmission antennas of the base station in communication with the mobile communication terminal indicative of the modulation method; wherein the AMC transmitter of the base station is configured for selecting at least one adaptive coding rate and at least one modulation method according to the estimated forward channel characteristics in the second output provided by the mobile communication terminal;

a second logic unit for coding and modulating a plurality of transmission signal layers generated for transmission by a plurality of transmission antennas according to the first and second outputs, and a third logic unit for transmitting the plurality of transmission signal layers to the plurality of transmission antennas simultaneously by way of BLAST-coding.

17. The base station of claim 16, wherein the AMC transmitter comprises:

a MCS level selector for selecting an optimum coding rate and modulation method according to the estimated forward channel characteristics; and an encoder for encoding transmission signal layers, according to the selected adaptive coding rate and the modulation method.

18. The base station of claim 17, wherein the AMC transmitter further comprises a channel interleaver for channel-interleaving the encoded transmission signal layers according to the coding rate.

19. The base station of claim 18, wherein the AMC transmitter further comprises a modulator for modulating the transmission signal layers produced the channel interleaver according to the modulation method.

20. The base station of claim 19, wherein the AMC transmitter further comprises a BLAST processing unit for transmitting at least one symbol in the transmission signal layers to the plurality of transmission antennas simultaneously by way of BLAST-coding, wherein the transmission symbol has a vertical form in temporal and spatial axes.

21. An adaptive modulation coding (AMC) method for a mobile communication system, the method comprising:

receiving, in a base station, BLAST-decoded signals transmitted by a plurality of transmission antennas of a mobile terminal in communication with said base station, wherein the BLAST-decoded signals comprise forward channel characteristics information as estimated by the mobile communication terminal;

selecting at least one adaptive coding rate and at least one modulation method according to the estimated forward channel characteristics information associated with a plurality of transmission antennas in the base station;

generating a first signal indicative of the adaptive coding rate;

generating a second signal indicative of the modulation method;

coding and modulating a plurality of transmission signal layers generated for transmission by the plurality of transmission antennas according to the first and second signals; and transmitting the plurality of transmission signal layers to the plurality of transmission antennas simultaneously by way of V-BLAST-coding.

22. The method of claim 21, wherein the selecting comprises:

selecting a 1/3 coding rate and a QPSK method when SNR of a forward channel is not greater than a first threshold value.

23. The method of claim 21, wherein the selecting comprises:

selecting a 2/3 coding rate and a QPSK method when SNR of a forward channel is not less than the first threshold value and not greater than a second threshold value.

24. The method of claim 21, wherein the selecting comprises:

selecting a 2/3 coding rate and a 8PSK method when SNR of a forward channel is not less than the second threshold value and not greater than a third threshold value.

25. The method of claim 21, wherein the selecting comprises:

selecting a 2/3 coding rate and a 16QAM method when SNR of a forward channel is not less than the third threshold value.

26. The method of claim 21, wherein the selecting comprises:

selecting a 1/3 coding rate and a QPSK method when SNR of a forward channel is not greater than a first threshold value;

selecting a 2/3 coding rate and a QPSK method when SNR of a forward channel is not less than the first threshold value and not greater than a second threshold value;

selecting a 2/3 coding rate and a 8PSK method when SNR of a forward channel is not less than the second threshold value and not greater than a third threshold value; and selecting a 2/3 coding rate and a 16QAM method when SNR of a forward channel is not less than the third threshold value.

27. The method of claim 21, wherein the selecting comprises applying a coding rate and modulation method to at least one of the plurality of transmission antennas.

28. The method of claim 21, wherein the BLAST-decoding comprises:

arranging the signals received from the plurality of reception antennas as a reception vector;

estimating a certain symbol by regarding other symbols in the signals as an interference signal while estimating the certain symbol; and subtracting a first-detected signal components from the reception vector.

29. The method of claim 21, wherein the V-BLAST coding comprises:

transmitting transmission data of each plurality of transmission signal layers to each of the plurality of transmission antennas simultaneously such that the transmission data of each of the plurality of transmission signal layers has a vertical form in temporal and spatial axes.

30. A signal coding apparatus for a mobile communication system, the apparatus comprising:

an adaptive modulation and coding (AMC) receiver of a mobile communication terminal for decoding signals received from a plurality of reception antennas of the mobile communication terminal to estimate forward channel characteristics for a plurality of transmission antennas in an AMC transmitter of a base station in communication with the mobile communication terminal;

wherein the AMC transmitter of the base station is configured for:

selecting at least one adaptive coding rate and at least one modulation method according to the estimated forward channel characteristics;

coding and modulating a plurality of transmission signal layers generated for transmission by the plurality of transmission antennas according to the selected adaptive coding rate and modulation method; and transmitting the plurality of transmission signal layers to the plurality of transmission antennas simultaneously.

31. The apparatus of claim 30, wherein the plurality of transmission signal layers are generated based on number of the plurality of transmission antennas.

32. The apparatus of claim 30, wherein the adaptive coding rate and modulation method is selected for each transmission antenna.

33. The apparatus of claim 30, wherein the AMC receiver is operational to receive communication signals in a mobile terminal.

34. The apparatus of claim 30, wherein the AMC transmitter is operational to transmit communication signals in a base station.

* * * * *